(12) United States Patent
Tang

(10) Patent No.: US 7,581,594 B2
(45) Date of Patent: Sep. 1, 2009

(54) SURFACTANT METHOD FOR IMPROVED OIL RECOVERY FROM FRACTURED RESERVOIRS

(75) Inventor: Hongxin Tang, Walnut, CA (US)

(73) Assignee: ChemEOR, Inc., Covina, CA (US)

( * ) Notice: Subject to any disclaimer, the term of this patent is extended or adjusted under 35 U.S.C. 154(b) by 37 days.

(21) Appl. No.: 11/724,104

(22) Filed: Mar. 14, 2007

(65) Prior Publication Data
US 2007/0215347 A1    Sep. 20, 2007

Related U.S. Application Data

(60) Provisional application No. 60/782,263, filed on Mar. 15, 2006.

(51) Int. Cl.
E21B 43/22    (2006.01)
E21B 43/26    (2006.01)
E21B 43/27    (2006.01)

(52) U.S. Cl. .................. 166/308.2; 166/279; 166/300; 166/310; 166/307

(58) Field of Classification Search .............. None
See application file for complete search history.

(56) References Cited

U.S. PATENT DOCUMENTS

| 2,792,894 | A | 5/1957 | Graham et al. | |
| 4,364,431 | A | 12/1982 | Saidi et al. | |
| 4,842,065 | A | 6/1989 | McClure | |
| 5,247,993 | A | 9/1993 | Sarem et al. | |
| 2004/0177960 | A1* | 9/2004 | Chan et al. | 166/280.1 |
| 2005/0043188 | A1* | 2/2005 | Chatterji et al. | 507/100 |
| 2006/0254774 | A1* | 11/2006 | Saini et al. | 166/300 |
| 2008/0119374 | A1* | 5/2008 | Willberg et al. | 507/209 |

OTHER PUBLICATIONS

Tor Austad et al., "Spontaneous imbibition of water into oil-wet carbonated", Journal of Petrol. Sci. & Engrng., 2003, pp. 363-376, vol. 3, Elsiver Science B.V.
H.L. Chen et al., "Labratory Monitoring of Surfactant Imbibition Using Computerized Tomography", Soc. of Petrol. Engrs., Feb. 2003, SPE 59006, SPE Int'l., Richardson, TX.
X. Xie et al., "Improved Oil Recovery from Carbonate Reservoirs by Chemical Stimulation", Soc. of Petrol. Engrs., Apr. 2004, SPE 89424, SPE Int'l., Richardson, TX.
William W. Weiss et al., "Artificial Intelligence Used to Evaluate 23 Single-Well Surfactant Soak Treatments", Soc. of Petrol. Engrs., Apr. 2004, SPE 89457, SPE Int'l.
George Hirasaki et al., "Surface Chemistry of Oil Recovery From Fractured, Oil-Wet, Carbonate Formations", Soc. of Petrol. Engrs., Feb. 2003, SPE Journal.
William W. Weiss et al., "AI applied to evaluate waterflood response, gas behhind pipe, and imbibition stimulation treatments", Journal of Petrol. Sci. & Engrng., 2005, pp. 110-121, vol. 49, Elsiver Science B.V.
William W. Weiss et al., "Artficial Intelligence Used to Evaluate 23 Single-Well Surfactant Soak Treatments", Soc. of Petrol. Engrs., 2006.

* cited by examiner

*Primary Examiner*—Zakiya W. Bates
(74) *Attorney, Agent, or Firm*—John S. Reid

(57) ABSTRACT

A method to enhance oil recovery from a fractured carbonate reservoir, the reservoir being accessible via a production well. The method includes injecting a surfactant solution including surfactants into the production well, and injecting a second well treatment process into the production well. The second well treatment process includes a second well treatment solution. The second well treatment solution is selected from the group consisting of a scale inhibition squeeze process, a well acidizing process, a chemical process to reduce water production rate, carbon dioxide injection for stimulation of a production or injection well, an acid fracturing process, and a hydraulic fracturing process. The surfactant solution and the second well treatment solution are injected into the production well within less than about six months from one another.

14 Claims, No Drawings

SURFACTANT METHOD FOR IMPROVED OIL RECOVERY FROM FRACTURED RESERVOIRS

RELATED APPLICATION

This application claims the benefit of U.S. Provisional Application No. 60/782,263, filed Mar. 15, 2006, which is hereby incorporated by reference herein in its entirety.

FIELD

The disclosures herein relate to the field of crude oil production, and particularly to methods to increase the recovery of crude oil from fractured carbonate subsurface reservoirs.

BACKGROUND

Many reservoirs from which oil and gas are produced are not homogeneous in the geologic properties (e.g. porosity and permeability). In fact, many of such reservoirs, especially those consisting of carbonate type of rocks (e.g. limestone and dolomite) are naturally and significantly fractured. Typical examples of such reservoirs are those in the Spraberry trend in West Texas. In addition, often in carbonate reservoirs the rock matrix is fractured deliberately by well treatments in order to increase the flow of fluids near the well bore region.

Fractured reservoirs consist of two distinct elements: fractures and matrix. The fracture system is a series of interconnected cracks that can transmit fluids easily (very high permeability), but make up only a small fraction of the total porosity. The matrix portion consists of the oil-bearing porous rock that typically has much lower permeability and has the bulk of the total porosity of the reservoir. Hydrocarbon production is normally less efficient in fractured reservoirs. During primary production the natural reservoir pressures to produce the oil in place will quickly decrease and more than 90% of the original oil in still left in place. Similarly, conventional methods of secondary recovery fail to displace substantial volumes of "left-in-place" oil.

Conventional waterflooding techniques have relatively low efficiency in highly fractured reservoirs. Waterflooding in these reservoirs is characterized by early water breakthrough and rapidly increasing water-oil ratios to an uneconomic level. The injected water tends to travel only through the fractures and not interact with the rock matrix. That is, the water cannot penetrate into the matrix and thereby displace and recover oil trapped in the porous matrix. This injected water tends to recover only the oil left behind in the fracture system following primary production. This limited or no interaction of the water with the matrix is caused in large part by the matrix portion not being water-wet. That is, the matrix will not spontaneously imbibe water.

One approach to increase the penetration of a water phase with the matrix blocks containing trapped oil is to add a surfactant to the water. Previous research and field experience has demonstrated that including a low concentration of the properly selected surfactant to the water will reduce the interfacial tension and also create now a water-wet condition in the area near the fracture face. With this altered condition, the aqueous phase then penetrates some distance into the porous matrix and thereby pushes out some of the oil that was within the pore spaces. In this countercurrent imbibition process the oil that is displaced from the matrix then moves into the fracture system. Once pushed into the fracture system, this oil can be moved easily to a production well. In a countercurrent imbibition process, with or without the addition of a water-wetting surfactant, the rate of oil recovery is dependent upon the capillary pressure characteristics of the porous rock matrix. That is, the imbibition process is essentially unaffected by conventional techniques for controlling field operations, such as selecting pressures and flow rates.

"Surface Chemistry of Oil Recovery from Fractured, Oil-Wet Carbonate Formations" (G. Hirasaki and D. L. Zhang, (2000)) describes an oil recovery process employing water-imbibition displacement in naturally fractured carbonate reservoirs. U.S. Pat. No. 4,364,431 to Saidi et al utilizes a surfactant to augment a waterflood which displaces oil from a fractured formation, by a gravity drive mechanism rather than an imbibition displaced mechanism. Saidi suggests that the surfactant reduces the interfacial tension between the water in the factures and the oil in the matrix blocks of the formation, which enables the oil to enter the factures where it is driven upward to a producing well by the density difference between water and oil.

Waterflood recovery by countercurrent imbibition may be further improved by the use of surface active agents which reduce interfacial surface tension between the oil and water phase, as disclosed in U.S. Pat. No. 2,792,894 by Graham. Examples included the improved imbibition into a porous rock by an aqueous phase that includes a surfactant. This process is advantageous for fractured reservoirs where there is a marked capillary pressure difference between the fluids in the fracture system and the porous rock formation.

U.S. Pat. No. 4,842,065 by McClure discloses that alternating surfactant slugs and water can improve oil recovery in fractured formations. The surfactant solution causes it to be the preferred wetting phase of the matrix blocks into the fracture network. The formation is then flooded with water from an injection well to displace the oil from the fracture network to the surface via a production well while returning the matrix blocks in the reservoir to a less water-wet condition. The injection cycle is repeated until the formation is depleted.

Austad and Standes in "Spontaneous Imbibition of Water into Oil-Wet Carbonates", *Journal of Petroleum Science and Engineering*, 2003, vol 39, pp. 363-376, describes laboratory experiments in which aqueous surfactant solutions recover oil from carbonate cores. These authors present data for a number of cationic and anionic surfactants, that when dissolved as a dilute solution in water, will imbibe spontaneously into carbonate cores containing a crude oil, and thereby recover some of this crude oil. H L Chen et al. present in paper SPE 59006 results for similar laboratory experiments in which aqueous solutions of nonionic surfactants imbibe into and thereby recover from carbonate cores oil formerly trapped inside the porous core. Hirasaki and Zhang demonstrate that anionic surfactants in an aqueous solution also containing sodium carbonate to increase the solution pH and adjust the salinity can imbibe into carbonate cores that contain initially a high saturation of a crude oil.

One method in particular to apply aqueous surfactant solutions to increase the oil recovery from fractured reservoirs is to treat individual production wells with a stimulation fluid that comprises a fresh water or brine with a suitable surfactant added. A "suitable surfactant" is a surfactant that will dissolve in the injection brine, be compatible with the reservoir brine, plus its solution has the desired behavior to penetrate spontaneously into a porous matrix. The injection-production method described below may be called a "huff-puff", "surfactant soak", or "surfactant squeeze" treatment. First, a production well halts production of fluids. Next a brine/surfactant solution is injected into the production well. This forces the treatment fluid into the fracture system some distance from the wellbore and into the reservoir. This is followed by an optional flush fluid to drive the surfactant deeper into the reservoir. The well may be shut-in for a period of time (typically from a few hours to a few days) to allow the surfactant solution to soak better into the matrix and displace some of the trapped oil in the matrix into the fracture system. Finally, the well is placed back on production and the extra oil forced into the fractures comes back to the production well and is produced. This process can increase the oil production for some period of time when the well is placed back on production. This oilfield application method is described, and is observed to recover additional oil, for example, in the HL Chen paper SPE (Society of Petroleum Engineers) 59006 and the paper by W. W. Weiss ("Artificial Intelligence Used to Evaluate 23 Single-Well Surfactant Soak Treatments", *SPE Reservoir Evaluation & Engineering*, June 2006).

The June 2006 paper by Weiss includes a discussion about the surfactant oil recovery results being worse than expected when there is an acid treatment that is performed before the application of the surfactant. It is speculated that the acid reacting first on the rock surfaces impedes the penetration of the surfactant that contacts those same acid-treated surfaces later. Thus combined application of the surfactant soak and a second process can produce a negative result. (It is noted that the June 2006 paper by Weiss et al. is dated after the priority date of this application, and so does not constitute "background" art, but is merely included to demonstrate an important point, and that is that other well treatments, when followed by a surfactant injection, can produce negative results over surfactant treatment alone.)

U.S. Pat. No. 5,247,993 to Sarem et al. describes an improvement wherein, if while performing a surfactant soak process in a fractured reservoir, that the fluid in the flush step (i.e., the fluid just after the surfactant slug) can increase the oil-mobility and decrease the water-mobility. Examples cited therein include using steam or hydrocarbon, or adding a thickening agent to the water flush.

A need therefore exists for processes that improve on the oil production and economic results of surfactant solution injection-production processes in oil reservoirs.

SUMMARY

At least one embodiment disclosed herein provides for a method to enhance oil recovery from a fractured carbonate reservoir, the reservoir being accessible via a production well. The method comprises injecting a surfactant solution comprising surfactants into the production well, and wherein the surfactant solution selected to recover additional oil from a porous matrix portion of the reservoir. The method also provides for injecting a second well treatment process into the production well, and wherein the second well treatment process including a second well treatment solution. The second well treatment solution is selected from the group consisting of a scale inhibition squeeze process, a well acidizing process, a chemical process to reduce water production rate, the injection of carbon dioxide as a stimulation fluid at either a production or injection wells, an acid fracturing process, and a hydraulic fracturing process. The surfactant solution and the second well treatment solution are injected into the production well within less than about six months from one another.

DETAILED DESCRIPTION

In one embodiment, a process is described to combine surfactant enhanced oil recovery ("EOR") "huff-puff" operation with other common oil field treatments performed in production wells in fractured reservoirs. These "other common oil field treatments" can include, but are not limited to, scale inhibitor squeeze, acid stimulation, other stimulation fluids (e.g. organic solvents to remove wax/asphaltenes), injecting polymer gels or other fluids to reduce the production rate of water, injecting carbon dioxide to stimulate oil production at either a production or an injection well, and injecting fluids for purposes of inducing cracks to improve fluid production flow (commonly called "hydraulic fracturing"). (When this last process includes injection steps with an acid solution, this treatment is referred to as "acid-fracturing".)

Using a combination of a surfactant EOR treatment and another production well treatment operation is a better strategy than using surfactant EOR treatment alone because: (a) it is more cost-efficient in terms of logistics to perform more than one well treatment process immediately one after the other (in this way equipment and labor are mobilized once for a combined operation rather than at two separate times); (b) when the surfactant soak treatment slug is injected first, then before or during the time while the EOR surfactant is soaking during an optional well shut-in period, preparations may be made for the other portions of the second well treatment program: when the second treatment fluid is injected first, then while that process is underway, on-site preparations may be made for the surfactant EOR treatment program; and (c) the chemicals involved in the other, second well treatment process can provide synergistic oil recovery performance when they mix with the EOR surfactant in-situ. That is, the oil recovery from the reservoir will be greater with the mixture of chemicals than with the sum of their oil recovery if practiced individually. This surprising result is contrary to results previously known (as discussed above), and offers additional opportunity to increase oil production from subterranean oil reservoirs.

In accordance another embodiment described herein, as an alternative process, in some cases the EOR surfactant can be combined intimately with the other treatment process fluid chemical to create a new blend of chemicals as a single treatment fluid. Having a single, combined function fluid can be advantageous in terms of: (a) simplifying the logistics and reducing the operational costs to apply effectively two well treatment effects simultaneously; and (b) taking advantage of potential synergistic performance between the combined chemical solutions. That is, a properly designed blended system can produce more oil than otherwise due to the surfactant action, plus have the same or even better intended result for the objective of the other chemical treatment system (e.g. accomplish more complete removal of formation damage, have better performance of scale-preventing chemical, etc.).

As indicated above, in one embodiment a surfactant EOR "huff-puff" operation is combined with another common oil field treatment or treatments performed in production wells in carbonate reservoirs to create a synergistic beneficial increase in oil recovery. The examples provided below illustrate how a mixture of the surfactant solution and the chemicals in the second treatment can produce a surprisingly greater oil recovery than otherwise would be expected. One reason that the advantageous results of the embodiments described herein is unexpected is that while the surfactant treatment is intended solely for the increase in oil recovery by its chemical action on the reservoir rock, the second treatment (or treatments) are not intended for more oil recovery per se, but are typically intended to reduce or remove impediments to total fluid production rate. So when properly designed, the combined process will produce more oil than by the surfactant process alone, plus the main function of the second treatment to remove or prevent flow restrictions, or increase fluid flow paths, will also be accomplished successfully.

Such combined treatments also have the advantage of reducing the logistic efforts and costs by conducting the two treatments in concert rather than as individual processes performed at separate times. These "other common oil field treatments" that can be combined with a surfactant EOR "huff-puff" operation include, but are not limited to, scale inhibitor squeeze, acid stimulation, other stimulation fluids (e.g. chemical fluids to remove inorganic, water-borne deposits or organic deposits such as wax or asphaltenes, injecting polymer-gels or other fluids for the purpose of reducing the rate of produced water, injecting carbon dioxide to stimulate the reservoir either at a production or injection well, and injecting fluids for purposes of inducing fractures to improve fluid production), and placing chemicals or materials near a production wellbore for purposes of reducing the rate of water production.

As indicated, none of the references cited consider, or they fail to implement successfully, the process improvements that lead to the surprising beneficial results described below when combining the surfactant solution EOP process in fractured carbonate reservoirs with other production well treatments performed for other purposes (e.g., removing plugging deposits, adding scale prevention chemical, reducing water production rate, or inducing additional fractures to increase ease of total fluid production).

It is recognized in the processes claimed herein that the details of its design need to be considered to have a successful further benefit to the amount of oil recovered when combining the surfactant treatment with secondary oil well treatments. For example, Example 4 (provided below) demonstrates that adding a proper surfactant with an acid as an intimate solution will provide a synergistic benefit to oil recovery. This combined process takes advantage of the physics of each process to work together better and hence recover more oil than otherwise possible by the sum of their oil recovery if applied as distinct individual processes.

As discussed above, highly fractured reservoirs consist of two distinct elements: fractures and matrix. The fracture system is a series of interconnected cracks that can transmit fluids easily (very high permeability), but makes up only a small fraction of the total porosity of the reservoir. The matrix portion consists of the oil-bearing porous rock that typically has much lower permeability but has the bulk of the total porosity of the reservoir. In the case where a hydraulic fracture or acid fracture treatment is performed, fractures are present at least due in part to a man-made activity. The process claimed herein is applicable to natural, as well as man-made (and combinations thereof) fracture systems in oil reservoirs.

The processes described herein are particularly applicable to formations having matrix blocks where an ordinary water-phase does not have a tendency to imbibe spontaneously into such a rock matrix. Such formations contain matrix blocks with most, if not all, of the rock surface is not water-wet.

While the processes described herein are not limited to formations of a given temperature, the processes are particularly useful in formations having a relatively lower ambient temperature. Thus the processes described herein are particularly applicable to formations having an ambient temperature range from about 20 C to 90 C, and more particularly from about 20 C to about 70 C.

The processes described herein are not limited by the salinity of the formation brine, or with the salinity of the make-up water for the surfactant treatment. However, the surfactant to be injected is selected to be compatible with the water in which it is dissolved, the brine in the formation, or when mixed with other treatment solutions. The word "compatible" in this instance means that the surfactant will dissolve essentially completely into the subject solution and result in no obvious precipitate forming after standing for at least 24 hours. Those skilled in the art can select surfactants that will fulfill these criteria. While not a limiting factor, advantageously the processes described herein are conducted in the presence of brine salinities of less than about 250,000 mg/l total dissolved solids, and more advantageously when the salinity is less than about 150,000 mg/l total dissolved solids.

One embodiment of the processes described herein comprises first applying a surfactant EOR treatment to an oil reservoir by injecting a surfactant into the reservoir, and subsequently applying a second well treatment process to the reservoir. The steps involved in performing this combined operation are as follows:

Cease production at an production well;

Inject a surfactant EOR solution (and an optional flush) into the production well;

Optionally, halting injection of the surfactant EOR solution and allowing a soak period. (Soaking can increase the surfactant solution penetration into the matrix system of the production well);

During (or before) the (optional) soak period, prepare surface operation for performing a second fluid treatment program comprising a second treatment fluid;

Inject the second treatment fluid into the production well to accomplish its primary intended purpose (e.g., remove scale, fracture, etc.);

Optionally inject a spacer slug of inert fluid into the production well; and

Place the well back on production.

As a result, more oil will be produced than if the surfactant EOR treatment is performed alone.

After the oil production rate declines substantially, the above steps can be repeated to again cause an increase in oil rate at the subject production well.

In another embodiment, a common well treatment fluid is first injected into an oil reservoir via a production well, followed with injecting a surfactant EOR treatment solution into the production well. The general procedure for this combination of treatments is as follows:

Cease production at an production well;

Inject common well treatment fluid into the production well to at least accomplish its intended purpose;

Optionally, inject a spacer slug of inert fluid into the production well;

Inject the surfactant EOR treatment solution into the production well;

Optionally, inject another spacer slug of inert fluid into the production well;

Optionally, halt injection and provide a soak period to allow the surfactant solution to penetrate into the matrix system; and Place the well back on production.

As a result, more oil will be produced than if the surfactant EOR treatment is performed alone.

After the oil production rate declines substantially, the above steps can be repeated to again cause an increase in oil rate at the subject production well.

A surfactant solution is selected for use in the present embodiments having a characteristic which is capable of altering the wettability of the matrix rock to be more water-wet.

The wettability-altering agent is a composition from a class of compounds commonly known as surfactants. Surfactants generally have a hydrophilic and a lipophilic character which varies as a function of the surfactant composition as well as the nature of the formation rock and connate fluids which the surfactant contacts.

The embodiments described herein are not limited to any particular surfactant, so long as the surfactant satisfies the above stated criteria. Nevertheless, a preferred surfactant for use in the present invention is one which achieves a substantially neutral balance between its hydrophilic and lipophilic character within the given formation in which the surfactant is placed. Exemplary types of anionic and nonionic surfactants or their mixtures which have particular utility in the present embodiments include ethoxylated alkylphenols, ethoxysulfate alkylphenols, ethoxylated alcohols, ethoxysulfate alcohols, alpha olefin sulfonates, internal olefin sulfonates, alkyl aryl sulfonates, petroleum sulfonates, propoxylated ethoxylated sulfonates. alcohols, propoxylated ethoxylated sulfates, and propoxylated ethoxylated Another class of surface active agents which are advantageously useful in carrying out the methods described herein are amine salts, ammonium salts, and others of a similar type of cationic surfactants, either alone or mixed with other types of surfactants. Exemplary of these compounds include primary amines; some commercial cationic surfactants (examples include Arquad T-50 (Trimethyl tallowalkyl ($C_{16}$-$C_{18}$) ammonium chloride) and Arquad C-50 (Coconut oil alkyl ($C_{12}$-$C_{14}$) trimethylammonium chloride, available from Akzo Nobel). The surfactants can be manufactured by synthetic means, or via biosynthesis. Exemplary of the biosurfactants include, but are not limited to, rhamnolipd or surfactin types.

The surfactant solution can be prepared by mixing the selected surfactant in a diluent. The concentration of the surfactant in the diluent is desirably greater than about 0.01% by weight. The surfactant concentration is desirably between about 0.1% and 4.0% by weight. The concentration is most desirably between about 0.1% and about 1.0% by weight. Brine generally has a total dissolved solids concentration above 1000 ppm while fresh water has a total dissolved solids concentration below about 1000 ppm.

The volume of the initial surfactant solution slug which is injected into the formation depends on which one of several embodiments encompassed within the present disclosure is being practiced. A number of variations in the processes disclosed herein can be used, depending on which well treatment processes are employed and the specific sequence in which they are employed. Generally, a useful surfactant treatment volume is between 100 and 50,000 barrels (each barrel contains 42 gallons). The surfactant volume solution volume is most desirably between about 500 and about 10,000 barrels.

The surfactant slug injected into the reservoir can be preceded by (or followed by) a spacer slug volume of a fluid such as a non-damaging, inert brine (e.g. 3 wt % potassium or ammonium chloride). If the spacer slug is employed, a typical size of the spacer slug is at least the volume of the wellbore; the spacer slug can be a larger volume if it preferred to minimize the interaction in-situ between the fluid in the first process, the surfactant EOR treatment, and the fluids and chemical from the second process. If instead there is a preference to encourage mixing of the fluids in-situ to take advantage of a synergistic effect, then the spacer slug is not used, or its volume is kept small.

After the surfactant and optional spacer slug injection steps are completed the well can be shut-in for some period of time to allow the surfactant solution to imbibe into the matrix rock and thereby displace a significant volume of oil into the fracture system. The shut-in time is optional, and if included, can be from a few hours to 100 days or more. Typically, the shut-in time period, if employed, is from between about 2 to 10 days.

The second, "other" well treatment process is implemented either just after, or just before, the surfactant EOR treatment process (subject to inclusion of a spacer slug, as indicated above). Preferably (but by no means exclusively), the second well treatment program is performed after the surfactant EOR fluid soak period. The second well treatment process can be carried out with the same chemical design and injection procedures as has been conducted previously in production wells in fractured carbonate formations that have not ever employed a surfactant EOR treatment.

In a third embodiment, the surfactant EOR chemical is combined intimately with the fluids used in the other, second type of well treatment process. This modified chemical mixture can be used to recover more oil than otherwise would result from individual treatment using the two treatments separately because the surfactant included in the mixture provides an enhanced wetting condition for the porous matrix in the area of the fractures. The other intended purpose(s) of the second combined treatment fluid remain the same (e.g. apply a scale inhibitor, remove formation damage, reduce water production, create more fractures, etc.). In light of the above disclosure, those skilled in the art will understand how to create such a combined chemical solution that will include a suitable surfactant for altering the wettability of the contacted matrix portion, plus still perform the other intended treatment function, and in addition, create an initially formulated system wherein all of the chemical components are compatible with one another. Advantages to having a single combined treatment fluid include: (1) the time required to perform both treatment functions is shorter; (2) the logistics of implementing the process in the field is simpler than performing the surfactant EOR treatment followed by a different well treatment process; (3) there are synergistic benefits in improving the oil recovery performance of the surfactant EOR system than if it is implemented by itself, and (4) there can be the same or even better outcome for the second treatment function than otherwise if implemented by itself.

EXAMPLES

Example 1

Combining a scale inhibitor treatment with a surfactant EOR process results in a surprising, unexpected further increase in the oil recovery. That is, this process recovers more oil than would otherwise be recovered by the surfactant EOR process alone, since the scale inhibitor by itself has no ability to increase oil production.

In this first example, a surfactant EOR treatment is combined with a well treatment for purposes of applying a scale inhibitor chemical into the reservoir. This second treatment is called commonly a "scale inhibitor squeeze". The process for the scale inhibitor squeeze involves injection of a solution containing a scale inhibitor chemical, injecting an overflush brine solution to drive the scale inhibitor solution further into the reservoir, allowing for a soak time to permit most of the scale inhibitor to be retained within the formation, and then returning the production well to normal production. The scale inhibitor that is inside the reservoir will gradually appear in the produced fluids in a diluted form as the scale inhibitor slowly is leached into the produced fluids from the formation. The low concentrations of scale inhibitor in the produced water and oil have the desirable effect of preventing the deposition of some water-borne scale deposits in the reservoir and production system over an extended period of time.

Laboratory tests were performed to demonstrate that beneficial effects to oil recovery can result by from mixing a surfactant EOR system with a scale inhibitor chemical solution. Such a chemical mixture of surfactant and scale inhibitor can occur in-situ in the process disclosed herein.

One test series compared the oil recovery performance for a surfactant EOR solution by itself, and then in the presence of a dissolved scale inhibitor chemical. The procedure for these two comparison tests was as follows:

Two artificial cores (consists of finely disaggregated dolomite particles packed into a wire-mesh cylinder) were completely saturated with a light crude oil taken from a carbonate reservoir located in West Texas.

One core was immersed into a solution containing 0.2 wt % Tergitol 15-S-7 nonionic surfactant. (The composition of the salt solution containing the treatment chemicals is given in Table 1 below. This salt solution, with a total dissolved concentration slightly more than 3 wt %, is similar to that found in some fractured carbonate reservoirs in West Texas.)

The second core was immersed into a solution containing with 0.2 wt % Tergitol 15-S-7 nonionic surfactant, plus 100 pm of a commercial scale inhibitor, Dequest 2066.

Each core was placed in a separate Amott cell. The Amott cell device includes a volumetric burette attached to the top of a vessel to collect all of the crude oil expelled and recovered from the artificial core.

The cumulative volume of crude oil expelled and collected from each core was measured, versus the soaking time.

TABLE 1

Recipe for Salt Solution Used as Diluent for the Surfactant and the Surfactant Plus Scale Inhibitor Solutions

| Salt | Amount added to 1 liter of distilled water |
|---|---|
| NaCl | 20.0 grams |
| NaSO4 | 2.95 grams |
| CaCl2•2H2O | 4.4 grams |
| MgCl2•6H2O | 3.35 grams |

Table 2 (below) compares the oil recovery performance in a laboratory test with one sample having a surfactant EOR solution by itself versus a second sample with a chemical solution that also includes a low concentration of a common scale inhibitor. The cumulative oil recovery with the surfactant alone is approximately 59% of the initial oil volume in the artificial core. In contrast, the solution that has the scale inhibitor combined with the surfactant has a greater oil recovery of over 66% after soaking for 683 hours. Of importance, note that a solution of the scale inhibitor by itself recovers virtually no oil under the same experimental conditions.

TABLE 2

Comparison of the Oil Recovery by a Surfactant EOR Solution Alone Versus One that Also Has a Scale Inhibitor

| | Percent Oil Recovery | |
|---|---|---|
| Time Elapsed (Hours) | Surfactant 0.2 wt % Tergitol 15-S-7 | Surfactant + Scale Inhibitor 0.2 wt % Tergitol 15-S-7 + 200 ppm Dequest 2066 |
| 110 | 42.8 | 40.7 |
| 189 | 50.6 | 55.6 |
| 350 | 57.1 | 61.0 |
| 693 | 58.4 | 66.5 |

The above experimental results demonstrate there is an unexpected beneficial synergistic result of increased oil recovery beyond that of the surfactant EOR solution alone, when the treatment solution also includes a scale inhibitor chemical. Hence, the process disclosed herein, i.e., of creating in-situ mixtures of the two types of chemicals described in the example above, have a benefit of recovering more oil than otherwise possible by use of the treatments separately.

Example 2

When an EOR surfactant solution is mixed with a scale inhibitor solution, the capability to prevent a scale precipitate is no worse than by the scale inhibitor solution alone. That is, the EOR surfactant has no significant effect on the scale inhibitor treatment process result.

Additional laboratory tests were performed to demonstrate that an EOR surfactant can be mixed into a scale inhibitor chemical solution and not adversely impact the scale inhibitor performance. Such a chemical mixture of surfactant and scale inhibitor can occur in-situ in accordance with the presently disclosed processes, wherein a surfactant EOR treatment is combined with a scale inhibitor squeeze.

A series of laboratory tests were performed to compare the ability of a scale inhibitor only, versus a mixture of a scale inhibitor and a surfactant EOR solution to inhibit successfully the formation of water-borne scale deposits. The surfactants selected were two commercial nonionic products, Neodol 25-9 and Igepal CO-630, suitable for the surfactant process of this invention. The scale inhibitor selected was a commercial product called Dequest 2066.

The test procedure for this series of tests was as follows:

Make a solution using the mixture of salts as described in Table 1. Call this Brine A.

Make a solution of a solution containing 50 grams per liter of sodium carbonate. Call this Brine B.

Create 4 different solutions, and adjust to pH 7

Solution 1  50 grams of Brine A
Solution 2  50 grams of Brine A + 100 ppm Dequest
Solution 3  50 grams of Brine A + 100 ppm Dequest + 0.2 wt % Neodol
Solution 4  50 grams of Brine A + 100 ppm Dequest + 0.2 wt % Igepal CO- (Note that all 4 of these mixtures, Solutions 1 through 4 initially are clear)

Create 4 different samples for testing for scale inhibition

Sample 1   Solution 1 + 3 grams of Brine B
Sample 2   Solution 2 + 3 grams of Brine B
Sample 3   Solution 3 + 3 grams of Brine B
Sample 4   Solution 4 + 3 grams of Brine B Place all 4 samples in an oven at 40 degrees Centigrade Observe the clarity of the different samples and record the appearance of each solution versus elapsed time.

It is expected that mixing the salt solution Brine A with the sodium bicarbonate solution Brine B will induce the inorganic water-borne precipitate calcium carbonate. Furthermore, this process is expected to be even worse if the final solution is heated above room temperature because calcium carbonate is well known to be less soluble at elevated temperatures.

The results are summarized as follows in Table 3 below.

TABLE 3

Summary of Scale Inhibition Results -
Clarity of Brine Solutions Aged at 40 C.

| Time Elapsed (min) | Solution 1 | Solution 2 | Solution 3 | Solution 4 |
|---|---|---|---|---|
| 0 | clear | clear | clear | clear |
| 15 | cloudy | clear | clear | clear |
| 30 | cloudy | clear | clear | clear |
| 60 | visible solids | cloudy | cloudy | cloudy |

These results show that, as expected, Solution 1 (with no scale inhibitor) was the first to exhibit signs of incompatibility, with a cloudy appearance before 15 minutes, and visible suspended solids observed within 1 hour. The other 3 solutions (two of which contain some surfactant) all maintained a clear appearance for 30 minutes, and some cloudiness at 60 minutes. This indicates the Dequest 2066 was performing as a scale inhibitor, and that the presence of either of the two surfactants (in Solutions 3 and 4) did not hinder the ability of the added scale inhibitor to delay the onset of solids formation.

Example 3

A surfactant suitable for the EOR process in according to the present disclosure is compatible with an acid solution used in well stimulations.

Hydrochloric acid solutions are used frequently in well stimulation treatments of oil and gas production wells. There often are employed to dissolve bothersome scale deposits, such as calcium carbonate. One issue relevant to the present disclosure is if the surfactant process is combined with the usual acid treatment solution, will this mixture be compatible?

To that end, we compared the solution appearance of the following at room temperature:

Brine A in Example 2

Brine A in Example 2+1 wt % HCl

Brine A in Example 2+1 wt % HCl+0.2 wt % Igepal CO-630

All of these solutions remained clear throughout the 20 days of observation. Thus, this example illustrates that a compatible mixture that is a stable brine solution containing hydrochloric acid and also a surfactant suitable for the improved oil recovery processes described herein is feasible.

Example 4

A surfactant suitable for the EOR process described herein added to an acid treatment solution will recover more oil than either individual process.

The test procedure was the same as shown above in Example 1, except for the choice of the test solutions. These include:

(a) Surfactant only—0.2 wt % Igepal CO-630—a commercial nonionic surfactant (b) Surfactant plus acid—0.2 wt % Igepal CO-630+0.25 wt % HCl (c) Acid only—0.25 wt % HCl Each chemical system was added to an Amott cell containing a limestone core saturated with a West Texas crude oil. The initial oil content of the 3 cores was measured to be nearly the same for all of them:

(a) 5.83 gram (b) 6.19 gram (c) 6.26 gram

After immersing the cores with the respective test solutions in their individual Amott cells, the oil recovery was measured versus time. The results are as follows:

TABLE 4

Comparison of Oil Recovery by Chemical Soaking of a Limestone Core
Containing a West Texas Crude Oil.

| | Oil Recovery (ml) | | |
|---|---|---|---|
| Elapsed Time | System a | System b | System c |
| 2 hours | 0.1 | 0.1 | 0.1 |
| 16 hours | 0.2 | 1.7 | 0.9 |
| 24 hours | 2.2 | 3.3 | 2.4 |

As can be seen, the oil recovery is better with a combined surfactant plus acid solution than either one alone.

This demonstrates the non-obvious result that the oil recovery is surprisingly greater for the combination of surfactant and acid than either individual solution. These results show that the surfactant and acid work better together by improved penetration of the aqueous fluid that has a feature a dissolving effect on the porous matrix. This also demonstrates that an acid solution combined with a surfactant solution will recover oil effectively if such a solution is injected into an injection well.

A further embodiment includes providing a surfactant solution and a non-surfactant solution (or "second solution") to a carbonate oil-bearing reservoir in concert with one another, and within a proximate temporal period to one another. The proximate temporal period is less than the time period traditionally employed when using the surfactant solution and the second solution individually. That is, traditionally a surfactant solution and a non-surfactant solution are provided to a reservoir at different times, with the time period between applications of the two solutions being more than six months. I have determined that, by applying a surfactant solution and a non-surfactant solution together within a temporal period that is less than the traditional period, greater oil recovery can be obtained from a carbonate reservoir than if the two solutions are applied at the traditional times. Advantageously, I have determined that additional oil recovery can be obtained if the surfactant solution and the non-surfactant solution are applied within less than six months of one another, and more advantageously if the proximate temporal period is about thirty days. In either case, it will be appreciated that the disclosed proximate temporal period between applying the surfactant solution and the non-surfactant solution is significantly less than the traditional temporal period employed for providing these solutions to a carbonate reservoir individually. It will be further appreciated that the "proximate temporal period" for applying the surfactant solution and the second solution can also include applying these two solutions simultaneously.

Further, I have discovered that increased oil production from a fractured carbonate reservoir can be achieved by combining a surfactant solution and a non-surfactant solution to the reservoir within a proximate temporal period to one another (as described above), and wherein the non-surfactant solution is a well-servicing volumetric solution. A "well-servicing volumetric solution" is a solution configured to increase the volume of fluids that can be produced from a well in communication with the carbonate reservoir, and is not intended to increase the production of oil over other fluids in the reservoir. That is, a "well-servicing volumetric solution" only enables higher volumes of fluids to be produced from the well, without regard to whether the fluids contain additional oil or not. For example, a scale inhibitor is one kind of "well-servicing volumetric solution", and is configured to remove scale from production piping and the like to enable increased volumetric flow of fluids from the reservoir through the well (or wellbore). However, it will be fully appreciated by those of skill in the art that a scale inhibitor has no effect on the oil-to-water (or "oil-to-any-other-reservoir-fluid") ratio, but merely allows increased volumes of fluids to be produced from the reservoir. Other "well-servicing volumetric solutions" include acidizing or fracturing a well. Put another way, I have discovered that, by combining a surfactant solution to an oil-bearing carbonate reservoir (with the previously expected increase in oil-to-water increase in production as a result thereof), along with a "well-servicing volumetric solution" (as described above), that greater oil recovery can be achieved from the reservoir than if these two solutions are provided to the reservoir in the traditional manner (i.e., using the traditional temporal separation of the two solutions).

In a further embodiment, I have determined that increased oil recovery from a fractured carbonate oil-bearing reservoir can be obtained by injecting, into the reservoir, and within a proximate temporal period of one another, a surfactant solution and a weak acid solution. (Examples of a "weak acid" include, but are not limited to, carbon dioxide, acetic acid, formic acid, and (weak) hydrochloric acid.)

Those skilled in the art will recognize that modifications and variations can be made to the above disclosure without departing from the spirit of the present disclosure. Therefore, it is intended that this disclosure encompass all such variations and modifications as fall within the scope of the current disclosure, and the appended claims. Further, it is intended that the appended claims do not limit the scope of the above disclosure, and can be amended to include features hereby provided for within the present disclosure.

What is claimed is:

1. A method to enhance oil recovery from a fractured carbonate reservoir, the reservoir being accessible via a production well, the method comprising:
   injecting a surfactant solution comprising surfactants into the production well, the surfactant solution selected to increase an oil-to-water ratio of oil recovery from a porous matrix portion of the reservoir; and
   injecting a well-servicing volumetric solution into the production well to perform a second well treatment process; and wherein:
      the second well treatment process is selected from the group consisting of a scale inhibition squeeze process, a well acidizing process, a chemical process to reduce water production rate, an acid fracturing process, and a hydraulic fracturing process; and
      the surfactant solution and the second well treatment solution are injected into the production well within less than about six months of one another.

2. The method of claim 1, and wherein the surfactant solution and the well-servicing volumetric solution are injected into the production well within less than about thirty days of one another.

3. The method of claim 1, and further comprising:
   (a) halting fluid production from the production well;
   (b) injecting a slug of the surfactant solution;
   (c) shutting in the production well for a first soaking period of time;
   (d) injecting the well-servicing volumetric solution into the production well;
   (e) shutting in the well production for a second soaking period of time; and
   (f) returning the production well to fluid production to recover additional oil from the reservoir.

4. The method of claim 3, and further comprising, between steps (b) and (d), injecting a spacer slug of inert fluid into the production well.

5. The method of claim 1, and further comprising:
   (a) halting fluid production from the production well;
   (b) injecting the well-servicing volumetric solution into the production well;
   (c) injecting a slug of the surfactant solution;
   (d) injecting a spacer slug of inert fluid into the production well;
   (e) shutting in the production well for a soaking period of time; and
   (f) returning the production well to fluid production to recover additional oil from the reservoir.

6. The method of claim 5, and further comprising, between steps (b) and (d), injecting a spacer slug of inert fluid into the production well.

7. The method of claim 1, further comprising:
   (a) halting fluid production from the production well;
   (b) simultaneously injecting the well-servicing volumetric solution and the surfactant solution into the production well;
   (c) shutting in the well for a soaking period of time; and
   (d) returning the production well to production to recover additional oil from the reservoir.

8. The method of claim 7, further comprising, between steps (b) and (c), injecting a spacer slug of inert fluid into the production well.

9. The method of claim 1, wherein the surfactant is defined by properties comprising at least one of the following features:
   (a) the ability to change a wetting of the porous matrix rock to prefer wetting by an aqueous phase;
   (b) the ability to lower an oil and water interfacial tension between oil and water in the reservoir; or
   (c) to enhance compatibility with chemicals in the second well treatment process.

10. The method of claim 1 and wherein the surfactant solution is selected from the group consisting of ethoxylated alkylphenols, ethoxysulfate alkylphenols, ethoxylated alcohols, ethoxysulfate alcohols, alpha olefin sulfonates, internal olefin sulfonates, alkyl aryl sulfonates, petroleum sulfonates, propoxylated ethoxylated alcohols, propoxylated ethoxylated sulfates, propoxylated ethoxylated sulfonates, amine salts, ammonium salts, and mixtures thereof, including primary amines.

11. The method of claim 1 and wherein the surfactant solution is manufactured from biosynthesis (biosurfactant), including rhamnolipd and surfactin types thereof.

12. The method of claim 11, and wherein the surfactant solution comprises surfactants manufactured from biosynthesis (biosurfactant), including rhamnolipd and surfactin types thereof.

13. The method of 1, further comprising injecting a spacer slug into the reservoir in sequence with the surfactant solution and the well-servicing volumetric solution, and wherein the spacer slug is selected from the group consisting of fresh water brine, and a hydrocarbon.

14. The method of claim 1, and further comprising adding to the well-servicing volumetric solution at least one of a portion of the surfactant solution, or a second surfactant selected to increase the oil-to-water ratio of oil recovery from the porous matrix portion of the reservoir.

* * * * *